United States Patent
Hartig

[15] 3,642,438
[45] *Feb. 15, 1972

[54] METHODS FOR PREVENTION OF SURFACE WATER CONTAMINATION AND AIR POLLUTION BY FLUORINE COMPOUNDS FROM PHOSPHATE PLANTS

[72] Inventor: Rufus G. Hartig, 230 Hillsboro, Dover, Fla. 33602

[*] Notice: The portion of the term of this patent subsequent to Apr. 13, 1988, has been disclaimed.

[22] Filed: Apr. 15, 1969

[21] Appl. No.: 816,206

[52] U.S. Cl. .................. 23/153, 23/88, 23/121, 23/122, 23/182 R, 23/205
[51] Int. Cl. ................... C01b 7/22, C01b 33/00
[58] Field of Search ............... 23/153, 88, 122, 182, 205, 23/121

[56] References Cited
UNITED STATES PATENTS

| | | | |
|---|---|---|---|
| 2,094,902 | 10/1937 | Muller | 23/122 |
| 2,588,786 | 3/1952 | Winter | 23/153 |
| 2,819,151 | 1/1958 | Flemmert | 23/182 |
| 3,021,193 | 2/1962 | Cunningham | 23/88 |
| 3,087,787 | 4/1963 | Flemmert | 23/153 |
| 3,258,308 | 6/1966 | Peterson | 23/88 |
| 3,273,713 | 9/1966 | Parish | 23/153 |
| 3,323,861 | 6/1967 | Toyabe et al. | 23/88 |
| 3,455,650 | 7/1969 | Conte et al. | 23/153 X |

Primary Examiner—Edward Stern
Attorney—Carl B. Fox, Jr.

[57] ABSTRACT

Processes for eliminating fluorine contamination of surface waters, and other pollution, by fluorine compounds from phosphate plants, and for recovery of fluorine as hydrofluosilicic acid. The processes involve the separation of fluorine compounds from waste gases by absorption-desorption with NaF, BaF$_2$, or KF, and absorption of SiF$_4$ in water. HF may also be recovered.

5 Claims, 2 Drawing Figures

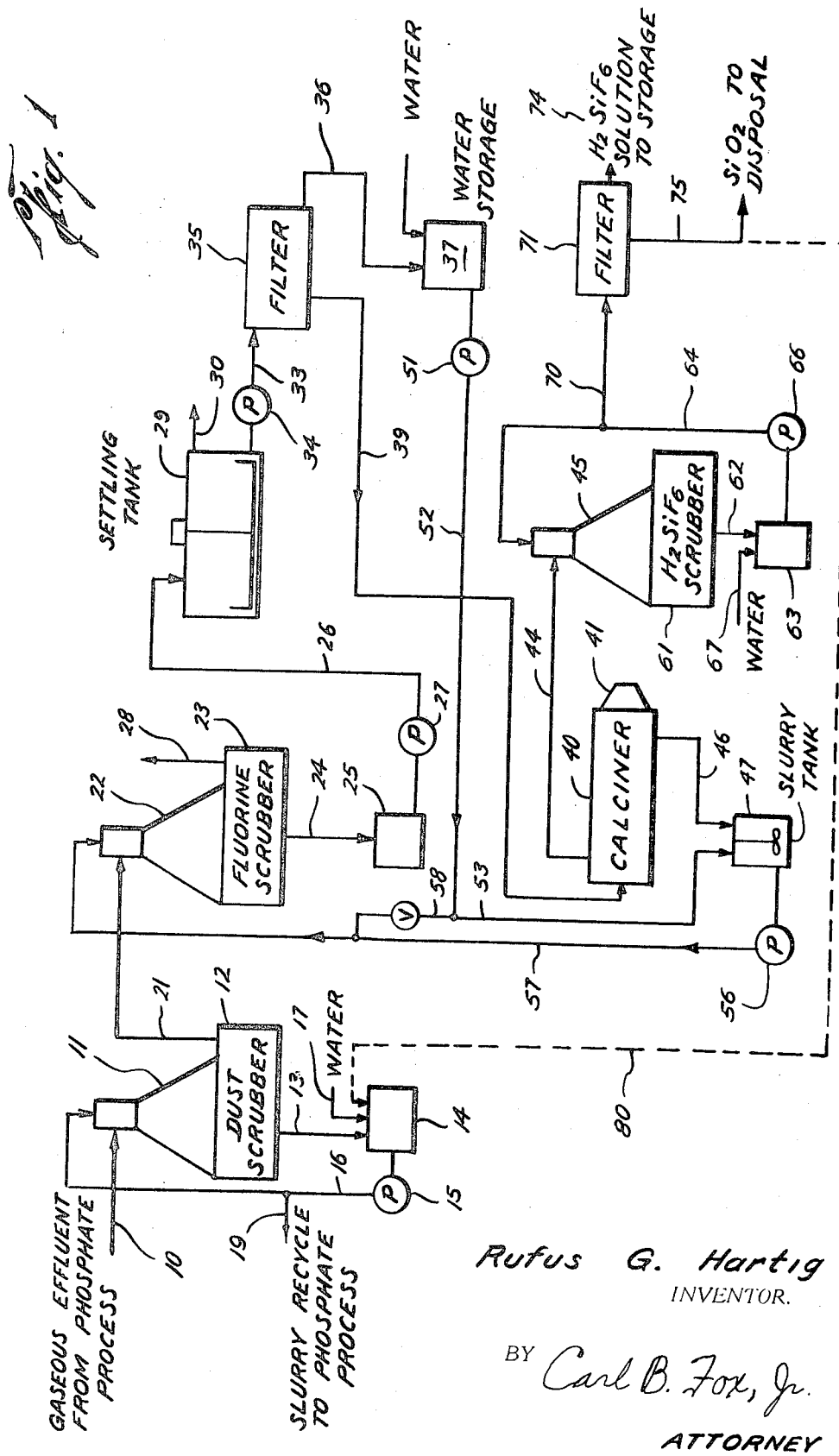

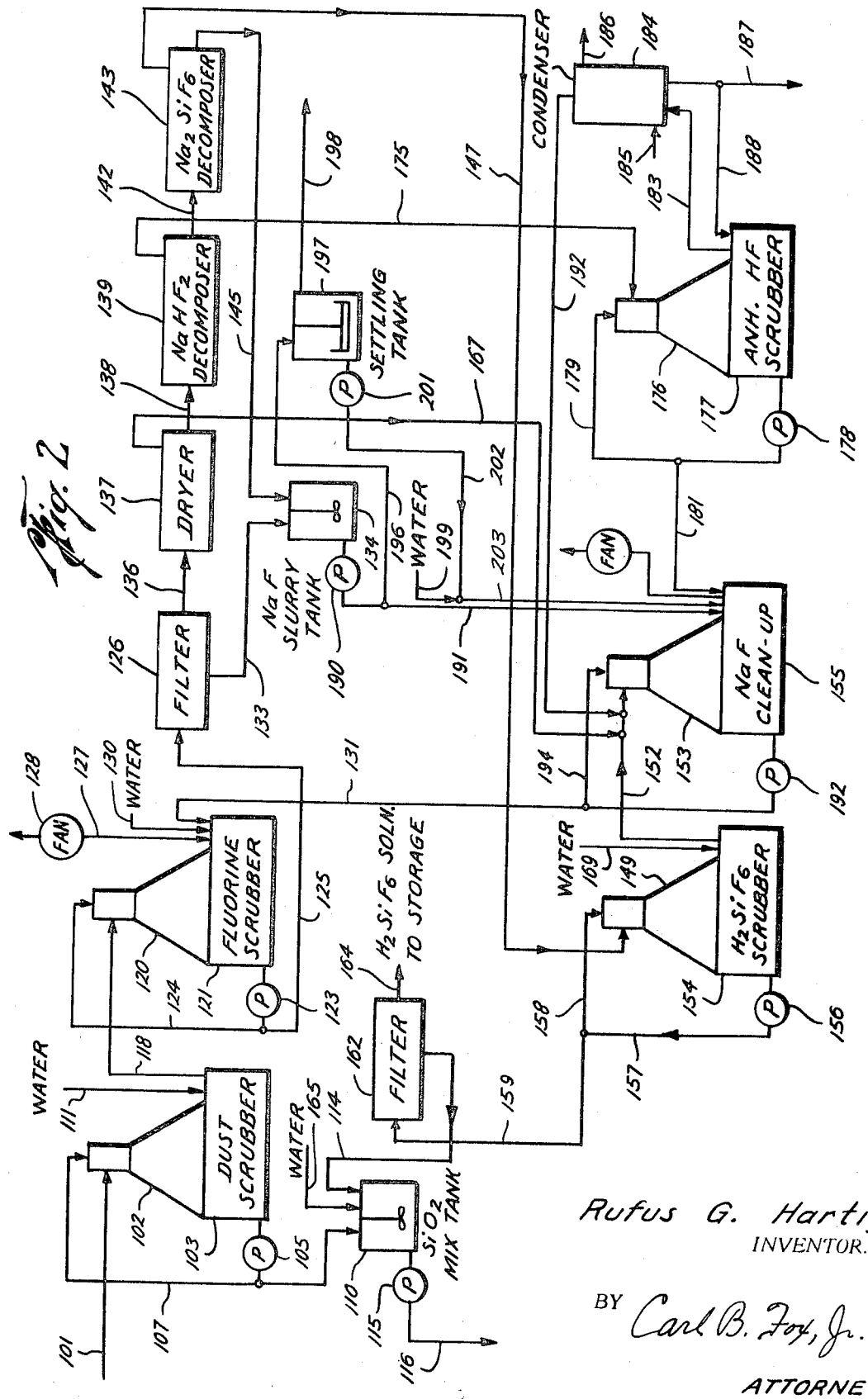

METHODS FOR PREVENTION OF SURFACE WATER CONTAMINATION AND AIR POLLUTION BY FLUORINE COMPOUNDS FROM PHOSPHATE PLANTS

This application is related to applicant's copending application Ser. No. 804,519, filed Mar. 5, 1969, now U.S. Pat. No. 3,574,542, issued Apr. 13, 1971.

BACKGROUND OF THE INVENTION

Phosphate plants of the type currently referred to as "phosphate complexes" commonly manufacture phosphoric acid, triple superphosphate, and diammonium phosphate. The phosphoric acid is wet-process phosphoric acid, which is manufactured by treating phosphate rock (fluorapatite) with sulphuric acid, producing phosphoric acid containing approximately 30 weight percent $P_2O_5$. Gypsum is a byproduct in this manufacture, gypsum having the chemical formula $CaSO_4 \cdot 2H_2O$. The phosphoric acid containing 30 percent $P_2O_5$, after filtration of the gypsum therefrom, is frequently evaporated to higher strengths of from about 40 percent $P_2O_5$ to about 55 percent $P_2O_5$. Phosphoric acid containing 50 percent $P_2O_5$ is frequently shipped in rubber-lined tank cars. In Florida and Louisiana, and possibly elsewhere, the usual procedure for disposing of gypsum is to slurry the gypsum with water and to pump the slurry to a large settling pond, which is usually formed by building earthen dikes around the perimeter of the pond to retain gypsum settled out therewithin. As the gypsum level rises, the earthen dikes may be elevated to provide more storage capacity. Under present practice, the gypsum so disposed of is not suitable for profitable use, so is left in the pond. When a pond is filled to the maximum practical depth, a new pond is commenced to retain the gypsum produced thereafter.

The gypsum-water slurry is pumped to various locations about the pond area, and the gypsum settles out, the clear water being returned to the phosphate complex for use. Depending on the characteristics of the soil upon which the gypsum pond is constructed, and on the weather, water may be added to the gypsum pond to maintain a desirable water level, or water may be withdrawn to prevent overflowing and discharge as surface water, which eventually enters a stream, river or other body of water. This water is often used in scrubbers to remove the fluorine from waste gas streams evolved in treating fluorapatite rock with acid in phosphoric acid and other manufacturing to eliminate air pollution by fluorine, phosphate, and sulphur compounds.

In recent years, both air and surface water pollution laws and regulations have been more stringent and have been more rigorously enforced. Many operating companies have had to treat at least some of the gypsum pond waters which are drained or overflowed from the ponds into surface waters with lime in order to reduce their acidity and to precipitate the fluorine components. This procedure has been carried out particularly during rainy periods when overflow of the gypsum ponds caused by excessive rains has resulted in large volumes of water overflowing and draining into adjacent surface waters.

In some phosphate complexes from 10,000 to 30,000 tons per year of fluorine compounds may be liberated in gaseous plant effluents, which are captured by scrubbing the gases with water, the scrubber waters being subsequently delivered to the gypsum ponds. In most cases, the fluorine concentrations in the gypsum pond waters remain fairly constant, under one percent fluorine, by weight. Material balances of the fluorine compounds indicate that most of the fluorine compounds disappear and cannot be accounted for in either air or stream pollution. The apparent answer is that a great bulk of the gypsum ponds water are lost by pond water leaching and subsequent pollution of underground streams and water supplies. Apparently, the pond water continuously drains downwardly from the pond into the earth therebeneath, where the pond water becomes mixed with the underground water streams and pools. In cases where the ground upon which the gypsum pond is constructed has poor leaching (subsurface drainage) characteristics, the fluorine content of the pond water has been found to be higher, and the volume of overflow water from the ponds has been greater. This supports the theory that in most cases considerable amounts of water are lost from gypsum ponds by subsurface drainage. The treatment of larger volumes of overflowed pond water results in higher operating costs for the plant, thereby reducing profit potential of the plant.

It is only a matter of time until pollution authorities will investigate not only the more or less apparent surface water conditions and the air pollution conditions at phosphate complexes, but will also commence investigating the subsurface pollution of underground waters. Regulations will be promulgated for control of this form of pollution and plant operators will be compelled to meet the requirements of the regulations. In view of the fact that subsurface waters are widely used for human consumption as well as for industrial uses, it is apparent that such subsurface pollution cannot be allowed to continue without control and regulation. In addition, it is anticipated that control of evaporation from gypsum ponds containing fluorine compounds, which introduces a certain amount of fluorine compounds into the atmosphere, will be subjected to control.

A principal object of the invention is to provide processes for controlling the fluorine content of gypsum pond waters of phosphate plants and complexes. An additional object of the invention is to control the fluorine content of waters passed to and overflowed from gypsum ponds. A further object of the invention is to provide processes for recovery of fluorine in valuable usable form.

Other objects and advantages of the invention will appear from the following description of preferred embodiments of the invention, with reference to the accompanying drawings showing two modifications of the invention.

BRIEF DESCRIPTION OF THE DRAWINGS

FIG. 1 is a schematic flow diagram showing one preferred embodiment of the invention.

FIG. 2 is a schematic flow diagram showing a modified form of the invention.

DESCRIPTIONS OF THE PREFERRED EMBODIMENTS

Referring first to the embodiment of the invention shown in FIG. 1 of the drawings, a gaseous effluent stream from a phosphate complex or other phosphate process is delivered through conduit or line 10 to the upper portion of a dust scrubber 11. The effluent gas contains $SiF_4$, some HF, air, and has entrained therein phosphates in both solid and liquid forms. The liquid droplets contained in the gaseous effluent may consist of droplets of solutions of phosphoric acid ($H_3PO_4$), and solutions of phosphate salts. The dusts may contain phosphate rock dust, mono- and dicalcium phosphate, and many other materials depending on the type of plant and manner of its operation.

Dust scrubber 11 is a water scrubber, water slurry flowing downwardly through the scrubber and the gas flowing downwardly concurrent with the scrubber liquor. The scrubber contains a liquid compartment 12 at its lower end from which the scrubber liquor drains through conduit 13 to pump tank 14, from which it is pumped by pump 15 through line 16 for recycle to the top of the scrubber. Makeup water is added at 17 as required to maintain the proper dilution of the scrubber liquor. The scrubber liquor is usually maintained to have a solid content of from 20 to 30 percent solids, by weight, the phosphate (expressed as $P_2O_5$) concentration being from about 40 percent to about 50 percent by weight. These concentrations will vary depending on the dust and liquid phosphate contents of the gas stream. In the scrubber liquor, $SiF_4$ (silicon tetrafluoride) is dissolved or reacted with water according to the following chemical reaction:

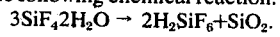

In the scrubber liquor, the fluosilicic acid concentration reaches a strength of about 25 percent $H_2SiF_6$, by weight. A small portion of the scrubber liquor is recycled to the processing units through line 19. All $P_2O_5$ lost as liquid or dust carryover with the effluent gases is recovered on return to the processing plant, the recycled $H_2SiF_6$ being decomposed during processing and coming off at a later time in the effluent gases in the form of HF and $SiF_4$.

In view of the fact that the scrubber liquor in scrubber 11 is maintained at saturation, with a $H_2SiF_6$ concentration of about 25 percent, by weight, the bulk of the $SiF_4$ passes through dust scrubber 11 in the vapor stage and is recovered as $Na_2SiF_6$, $K_2SiF_6$, $BaSiF_6$, or other similar salt, in fluorine scrubber 22. This scrubber has a liquid compartment 23 at its lower end, from which scrubber liquor is delivered through conduit 24 to pump tank 25. The scrubber liquor in this case is delivered through line 26 by a pump 27, to a settling tank 29. A slight excess of one or more of NaF, $BaF_2$, and KF is maintained in scrubber 22. The $SiF_4$ reacts therewith to form $Na_2SiF_6$, $BaSiF_6$, or $K_2SiF_6$ according to one or more of the following reactions:

$$2NaF+SiF_4 \rightarrow Na_2SiF_6$$
$$BaF_2+SiF_4 \rightarrow BaSiF_6$$
$$2KF+SiF_4 \rightarrow K_2SiF_6$$

Because of the excess of NaF, $BaF_2$ and/or KF maintained in the scrubber, the vapor pressure of $SiF_4$ in scrubber 22 is nil, and therefore complete recovery of the fluorine content of the effluent gases from the plant is continuously maintained. Scrubbed gas is discharged through line 28.

If the gases delivered to the process contain appreciable amounts of HF (hydrofluoric acid) additional NaF (or KF) can be used to form $NaHF_2$ (or $KHF_2$) in either of the scrubbers 11, 22. Since $BaHF_3$ does not form, $BaF_2$ cannot be used for HF precipitation.

In settling tank 29, the mother liquor from scrubber 22 is settled, the $Na_2SiF_6$, $BaSiF_6$, and/or $K_2SiF_6$ settling out, while the effluent liquor is removed by overflowing through conduit or line 30. The thickened slurry from the bottom of settling tank 29 is delivered through line 33 by pump 34 to a filter 35, where the water phase is removed and passed through line 36 to a water storage tank 37. The solids are delivered via conveyor 39 to a calciner 40, heated by burner 41, wherein the solids are decomposed to form solid NaF, $BaF_2$, or KF, and gaseous $SiF_4$. The $SiF_4$ is delivered through line 44 to the upper end of the scrubber 45. The recovered solids are delivered via 46 to a slurry tank 47 wherein water delivered from tank 37 by pump 51 and lines 52, 53 is mixed therewith to form the scrubber liquor for scrubber 22. The scrubber liquor is delivered by pump 56 and lines 57 to the upper part of scrubber 22. Water may be added to the scrubber liquor at valved line 58 if required.

The $SiF_4$ exiting from calciner 40 through line 44 is scrubbed with water in scrubbing tower 45. Tower 45 has a lower liquor compartment 61 from which scrubber liquor is passed through line 62 to pump tank 63. The scrubber liquor is circulated to the tower through line 64 by a pump 66. Makeup water may be added as required at 67.

A portion of the scrubber liquor is continuously drawn off through line 70 to a filter 71, wherein $H_2SiF_6$ in water solution is separated and delivered to storage as indicated at 74. $SiO_2$ is delivered from the filter by way of 75 and disposed of or used as convenient.

In scrubber 45, $H_2SiF_6$ and $SiO_2$ are formed according to the same reaction as occurs in tower 11, namely, $$3SiF_4 2H_2O \rightarrow 2H_2SiF_6+SiO_2.$$

The $H_2SiF_6$ water solution is maintained at a concentration of about 15 to 25 percent $H_2SiF_6$, by weight, by adjustment of water addition at 67.

The solid decompositions in calciner 40 occur according to the following chemical reactions:

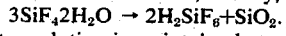
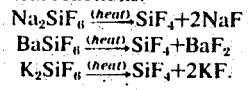

An alternative method useful in connection with the flow diagram shown in FIg. 1 is indicated by dashed line 80. If the incoming gas at line 10 contains an appreciable amount of HF, then the $SiO_2$ issuing from filter 71 at 75 may be delivered via 80 to the scrubber liquor of scrubber 11, so that the HF is converted to $SiF_4$ according to the following chemical reaction:

$$4HF+SiO_2 \rightarrow SiF_4+2H_2O.$$

The following reaction also takes place:

$$SiF_4+HF \rightarrow H_2SiF_6.$$

The $SiF_4$ passes through the dust scrubber (except for that dissolved to maintain the $H_2SiF_6$ concentration in the scrubber liquor) to be converted in scrubber 22 as has been described. This procedure is an alternative to the use of additional NaF and/or KF in scrubber 22 to remove HF from the gases. The alternative whereby $SiO_2$ is delivered via 80 to scrubber 11 is especially valuable in case the incoming gases in conduit 10 contain calcium. The formation of $CaF_2$ is prevented, in which form the fluorine would be lost to recovery. Without the presence of $SiO_2$ in scrubber 11, the calcium would react as follows:

$$Ca^{++}+2HF \rightarrow CaF_2+2H^+.$$

The presence of $SiO_2$ in the scrubber liquor results in the presence of the $SiF_6$ ion in solution in the scrubber liquor, to prevent the foregoing chemical reaction from taking place.

In other types of phosphate processing, such as in plants producing defluorinated calcium phosphate for use as animal feeds (as mineral feeds supplements), sintering or nodulizing processes, production of calcium and other metaphosphates, pyrophosphates, and the like, effluent gases are produced which contain the fluorine essentially in the form of HF, with only small amounts of $SiF_4$. In most of these processes, the volume of HF in the gas stream is very small, and the concentration of $SiF_4$ very much smaller. Since HF has a high vapor pressure over aqueous solutions, concentrated solutions of HF cannot be obtained by scrubbing the gases with water. Consequently, copious amounts of water are required with the addition of lime or limestone to remove the fluorine in the form HF, from the gas stream, or from liquid streams, in the processing plant.

A modified process is provided according to the invention for treatment of such gases, high in HF as compared with the $SiF_4$ content, to recover the fluorine in the form of saleable products, including anhydrous HF and aqueous fluosilicic acid ($H_2SiF_6$, and thereby eliminating pollution of the atmosphere and of streams and other bodies of water in the phosphate processing plant area. In addition, the process eliminates phosphate and other dust losses from the gas streams.

The gases to be treated according to the embodiment shown in FIG. 2 of the drawings generally contains HF, $SiF_4$, $H_2O$ vapor, $SO_2$, gaseous products of combustion, air, and phosphate dusts. The $SO_2$ is liberated from the sulphate present in the raw material feed, e.g., in plants producing defluorinated tricalcium phosphate ($Ca_3(PO_4)_2$), phosphate rock (apatite and/or fluorapatite) is intimately mixed with sulphuric acid. In virtually all phosphate processing operations phosphate rock in pulverulent form is treated with an acid, sulphuric acid being the most common reagent for the treatments, but other acids at times being employed. The $SO_2$, with the other gases, enters the dust scrubber, which removes the dust by scrubbing with an aqueous slurry containing 10 percent to 15 percent solids concentration.

Referring to FIG. 2 of the drawings, the gas stream, containing HF, $SiF_4$, $H_2O$ vapor, $SO_2$, gaseous products of combustion, air, and phosphate dusts, resulting from processes for manufacture of defluorinated phosphates, from nodulizing or sintering processes, from production of calcium, metaphosphates, pyrophosphates, and the like, are delivered through line 101, a pipe or other conduit, to the upper portion of a dust scrubber 102. The dust scrubber has a lower liquor compartment 103 in which circulated scrubber liquid is collected. A pump 105 delivers scrubber liquor from compartment 103 for recirculation to the top of scrubber tower 102 through a line 107. The recirculated slurry used as scrubber liquor in scrubber 102 is maintained to have about 10 percent to 15 percent, by weight, of solids. The solids concentration is maintained at this level by bleeding off a small slurry stream through line 108, which delivers the slurry to agitated tank 110, designated in the drawing as the "SiO$_2$ MIX TANK." Makeup water is added to compartment 103, to maintain the proper solids concentration in the scrubber liquor, through line 111. The scrubber slurry of scrubber 102 usually contains CaF$_2$, H$_3$PO$_4$, H$_2$SiF$_6$, H$_2$SO$_4$, and HF, which are dissolved from the incoming gas stream. SiO$_2$ filter cake is added to tank 110 via conveyor 114. A pump 115 delivers the slurry, to which SiO$_2$ filter cake has been added, through line 116 for retreatment in the plant from which the gases are evolved through line 101. The added SiO$_2$ facilitates defluorination in the plant as these materials are reprocessed.

Scrubbed gases are delivered from scrubber 102 through line 118. The gases are delivered to the upper end of a fluorine scrubber 120 having a liquor compartment 121 at its lower end. Scrubber 120 removes all HF and SiF$_4$ present in the gas stream. The gas is scrubbed in scrubber 120 by a 10–15 percent aqueous slurry containing excess NaF (or KF). The HF and SiF$_4$ are absorbed and converted to NaHF$_2$ (or KHF$_2$) and Na$_2$SiF$_6$ (or K$_2$SiF$_6$) according to the chemical reactions, HF+NaF → NaHF$_2$, and, SiF$_4$+$_{NaF}$ → $_{Na2}$SiF$_6$. The scrubber slurry concentration is maintained at 10–15 percent solids by bleeding off a small amount of slurry. The scrubber slurry is recirculated by pump 123 through line 124 to the top of the tower 120. The bleedoff of slurry passes through line 125 to a filter 126. The scrubbed gases are exited from the upper part of compartment 121 by way of line 127 by fan 128. Water is added to compartment 121 through line 130. NaF-water slurry is added through line 131.

The excess of NaF (or KF) maintained in scrubber 120 reduces the HF and SiF$_4$ vapor pressures to zero, enhancing complete fluorine removal from the gas stream. Some SO$_2$ will be oxidized forming Na$_2$SO$_4$, the disposal of which is discussed below.

Filter 126 removes solids from the slurry, primarily the NaHF$_2$ and Na$_2$SiF$_6$ mentioned above. The filtrate is delivered through 133 to an NaF slurry tank 134. An agitator is provided to mix the contents of this tank. The solids removed by filter 126 are passed via conveyor 136 to a dryer 137. The drying temperature in dryer 137 is maintained at approximately 220° F. to 230° F. The dried solids are passed via conveyor 138 to NaHF$_2$ decomposer 139, in which the solids are heated to a temperature of approximately 600° F.

In decomposer 139, the NaHF$_2$, separated with Na$_2$SiF$_6$ from the slurry from tower 120, is decomposed to form gaseous HF and solid NaF, the latter being passed with the not-yet-decomposed Na$_2$SiF$_6$ by a conveyor 142 to Na$_2$SiF$_6$ decomposer 143. In decomposer 143, the solids are heated to a temperature of approximately 1,300° F., so that Na$_2$SiF$_6$ is decomposed to form NaF and gaseous SiF$_4$. The NaF formed in both decomposers 139 and 143 is delivered by way of conveyor 145 to NaF slurry tank 134, where the solids are mixed with the filtrate from filter 126 delivered through line 133.

The gaseous SiF$_4$ emitted from decomposer 143 is delivered through line 147 to the upper end of a H$_2$SiF$_6$ scrubber 149. The gases passing through conduit 147 will contain air admixed with the SiF$_4$ gas, and depending on the forms of equipment, other gases may be present, for example, combustion gases resulting from the dryer and/or the decomposers. The scrubbed gases from scrubber 149 are delivered by line 152 to NaF cleanup scrubber 153. Filter 162 removes primarily SiO$_2$ from the scrubber liquor from tower 149, the SiO$_2$ being formed according to the chemical reaction 3SiF$_4$+2H$_2$O → 2H$_2$SiF$_{A/}$⅔SiO$_2$.

Scrubber 149 has a lower liquor compartment 154, and scrubber 153 has a lower liquor compartment 155. Pump 156 recirculates scrubber liquor through tower 149 through pipes 157, 158. A part of the scrubber liquor of tower 149 is continuously drawn off from the recycling stream by way of pipe 159, the scrubber liquor being filtered in a filter 162. The solids filtered from the liquor are delivered by way of line 114 to SiO$_2$ mix tank 110. The filtrate solution, a solution of H$_2$SiF$_6$ containing from 15–25 percent H$_2$SiF$_6$, by weight, is delivered to storage at 164. In order that the gravity and solids content of the materials in SiO$_2$ mix tank 110 may be maintained properly, water may be added to this tank through line 165 from an appropriate source of water.

As will be noted from FIG. 2, the gases driven from the solids by heat in dryer 137 are delivered through a conduit or line 167 to be mixed with the gases delivered through line 152 from scrubber 149.

Water is added as required through line 169 to the compartment 154 of scrubber 149.

Gases from decomposer 139 containing HF are delivered through conduit or pipe 175 to the upper end of an anhydrous HF scrubber 176. Scrubber 176 has a liquid compartment 177 at its lower end, from which recycled scrubber liquor is recirculated by a pump 178 through recirculation line 179. A portion of the recirculated liquor is delivered through line 181 to compartment 155 of scrubber 153. Scrubber 176 is provided primarily to remove dusts intrained in the gases from decomposer 139. The scrubbing medium is anhydrous HF containing dusts scrubbed from the gases in suspension. The scrubbed gases are delivered through line 183 to a condenser 184 cooled by cooling water incoming through line 185 and discharged through line 186. HF condensed from the gases is discharged through line 187, a portion thereof being recycled to compartment 177 of scrubber 176 through line 188. The gases from which the HF is condensed is delivered by way of line 192 to be mixed with the gases in conduit 152.

The filtrate from filter 126, as has been stated, is passed through line 133 to NaF slurry tank 134. In this tank, NaF delivered by way of conveyor 145 from Na$_2$SiF$_6$ decomposer 143 is admixed with the filtrate and pumped by a pump 190 through line 191 to compartment 155 of scrubber 153. The scrubber liquor from compartment 155 is delivered by pump 192 and line 131 to fluorine scrubber 120. A portion of this liquor is recycled through tower 153 through conduit 194.

It has been mentioned that there may be a certain amount of SO$_2$ gas combined with the gases flowing into the processes through conduit 101. The amount of SO$_2$ which builds up in the mother liquor of fluorine scrubber 120 depends on the amount of SO$_2$ that is present and the O$_2$ concentration of the gases, as well as on the pH$^+$of the scrubbing liquor. The SO$_2$ precipitates, upon contact with the NaF present in the scrubber liquor of tower 120 to form Na$_2$SO$_4$. The Na$_2$SO$_4$ is soluble and a portion thereof is continuously removed by diverting a stream from pipe 191 through line 196 to settling tank 197. Supernatant liquor containing Na$_2$SO$_4$ is diverted by way of line 198 which may be recycled to the processing plant or otherwise disposed of. The thickened slurry from the bottom of tank 197, containing NaF, is delivered by a pump 201 by way of line 202 to be flowed into compartment 155 of scrubber 153 by way of line 203. Water may be added to this liquid as required through line 199.

As an alternative, the mother liquor containing the SO$_4$ ion may be removed by treating the mother liquor with BaCO$_3$, precipitating the sulphate content as BaSO$_4$. The BaSO$_4$ is filtered off and dried to produce a saleable product. Na$_2$CO$_3$ produced by the reaction, Na$_2$SO$_4$+BaCO$_3$ → BaSO$_4$+Na$_2$CO$_3$, can be recycled to the fluorine scrubber. If this is done on a continuous basis, the SO$_2$ content of the mother liquor is continuously reduced, and thereby SO$_2$ is not exhausted excessively to the atmosphere through line 127 and blower 128.

While preferred embodiments of the invention have been shown and described, many modifications thereof may be made by a person skilled in the art without departing from the spirit of the invention, and it is intended to protect by Letters Patent all forms of the invention falling within the scope of the following claims.

I claim:

1. Method for treating waste gases from phosphate manufacturing plants to remove SiF$_4$ therefrom as H$_2$SiF$_6$ in water solution and to remove any HF as may be present therein as HF, comprising scrubbing said waste gases with a scrubber water slurry containing an excess of one or more reactants selected from the group consisting of NaF, $BaF_2$, and KF to remove $SiF_4$ from the waste gases as one or more compounds selected from the group consisting of $Na_2SiF_6$, $BaSiF_6$, and $K_2SiF_6$ dissolved in the scrubber water slurry to saturation thereof and precipitated therein, whereby $SiF_4$ is removed from the waste gases, and to simultaneously remove any HF present in said waste gases as one or more compounds selected from the group consisting of $NaHF_2$ and $KHF_2$ which are precipitated at the same time as said precipitated fluosilicates, separating the precipitated fluosilicates and any $NaHF_2$ and $KHF_2$ from the water phase, heating the fluosilicate and any $NaHF_2$ and $KHF_2$ to decompose the fluosilicate into $SiF_4$ driven off with other gases and one or more compounds selected from the group consisting of NaF, $BaF_2$ and KF, recovering the $SiF_4$ from said other gases as a water solution of $H_2SiF_6$ by contacting the $SiF_4$ with water, slurrying the said one or more compounds selected from the group consisting of NaF, $BaF_2$ and KF with said water phase and combining same with said scrubber water slurry to scrub additional waste gases.

2. Method according to claim 1 said waste gases also containing HF, said HF in said waste gases being absorbed by and precipitated from said scrubber water slurry, at the same time as said fluosilicates are precipitated, as one or more compounds selected from the group $NaHF_2$ and $KHF_2$ to be separated with said precipitated fluosilicates, said heating being done in two stages to first drive off HF at a relatively lower temperature and later to drive off $SiF_4$ at a relatively higher temperature, and recovering the HF.

3. Method according to claim 2, including washing said other gases after $SiF_4$ has been removed therefrom by said contact with water with said water phase slurry before combining same with said scrubber water slurry to scrub additional waste gases.

4. Method according to claim 1 said waste gases also containing dusts, said contact of $SiF_4$ with water also forming $SiO_2$, said method including prescrubbing said waste gases with a recirculated prescrubber water to remove dusts therefrom and said prescrubber water becoming saturated with $H_2SiF_6$ by said $SiF_4$ reaction with water whereby $SiF_4$ passes therethrough to be removed by said scrubber water slurry as described and adding said $SiO_2$ to said prescrubber water to convert HF in said waste gases to $SiF_4$ for treatment with the other $SiF_4$ in said waste gases.

5. Method according to claim 1, said waste gases also containing dusts, and HF, the phosphate manufacturing plant including a kiln from which at least a portion of said waste gases are received, said contact of $SiF_4$ with water also forming $SiO_2$, said method including prescrubbing said waste gases with a recirculated prescrubber water to remove dusts therefrom and the prescrubber water becoming saturated with $H_2SiF_6$ by said $SiF_4$ reaction with water, whereby $SiF_4$ passes therethrough, to be removed by said scrubber water slurry as described, said method including continuously withdrawing prescrubber water and admixing said $SiO_2$ therewith, and returning said mixture to said kiln whereby said $SiO_2$ acts in said kiln to convert HF in said waste gases in said kiln to the form of $SiF_4$.

* * * * *